(No Model.)
G. P. SCHMIDT.
DEVICE FOR SPREADING CARCASSES.
No. 399,933. Patented Mar. 19, 1889.
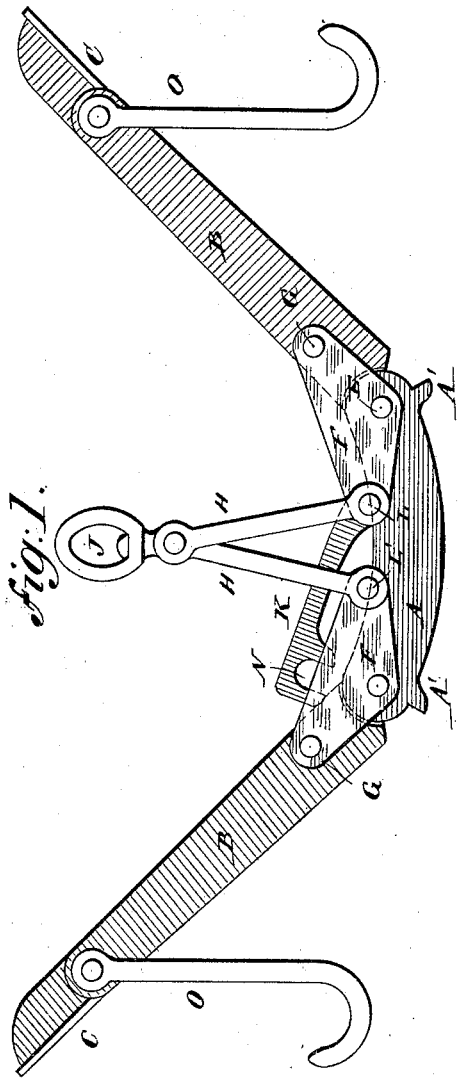
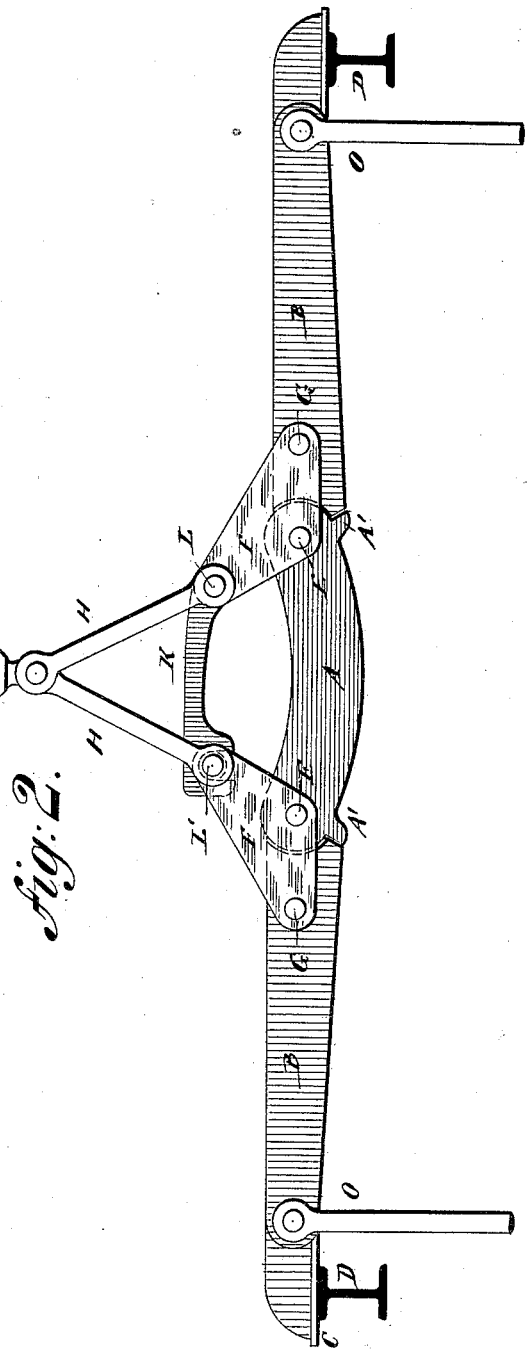
WITNESSES:
A. Schehl
Martin Petry
INVENTOR
Gottlieb Paul Schmidt
BY Goepel & Raegener
ATTORNEYS.

UNITED STATES PATENT OFFICE.

GOTTLIEB PAUL SCHMIDT, OF SCHMIEDEBERG, SAXONY, GERMANY.

DEVICE FOR SPREADING CARCASSES.

SPECIFICATION forming part of Letters Patent No. 399,933, dated March 19, 1889.

Application filed August 17, 1888. Serial No. 283,029. (No model.) Patented in Germany December 11, 1886, No. 40,400.

*To all whom it may concern:*

Be it known that I, GOTTLIEB PAUL SCHMIDT, of Schmiedeberg, in the Kingdom of Saxony and Empire of Germany, have invented certain new and useful Improvements in Devices for Spreading Carcasses, (for which Letters Patent have heretofore been granted to me in Germany, No. 40,400, dated December 11, 1886,) of which the following is a specification.

The object of my invention is to provide a new and improved device for automatically spreading the rear legs of carcasses in slaughter-houses by the action of the weight of the carcasses on the spreading device.

The invention consists in the combination, with a center piece, of two levers pivoted to the ends of the same, hooks on the swinging ends of the levers, extension-pieces connected with the said levers near their pivoted ends, and also mounted to turn on the pivots of the levers, links connecting the inner ends of said extension-pieces with a swivel-eye, and a locking-lever pivoted to the inner end of one of the extension-pieces and adapted to engage with a pin on the other extension-piece.

In the accompanying drawings, Figure 1 is an elevation of my improved spreading device in the position the parts of the same have when not extended. Fig. 2 is an elevation of the same, showing the position it has when the carcass is spread and the device locked, rails being shown in section on which the device can rest.

Similar letters of reference indicate corresponding parts.

To the ends of the center piece, A, the levers B B are pivoted, and are provided at their outer ends with plates C, to rest on the beams D, for supporting the device. The center piece, A, is provided on its under side at each end with a lug, A', against which the pivoted ends of the levers B B can swing to prevent said levers swinging down farther than a horizontal position. On each pivot E, connecting the lever B with the end of the center piece, A, is a triangular extension-piece, F, the outer ends of said piece F being pivoted to the lever B by pins G, mounted to turn. The inner end of the extension-pieces F are connected by the links H with a swivel-eye, J. A locking-lever, K, has one end mounted to turn on the pin L, connecting one of the extension-pieces F with the lower end of a link, H, and on its free end said locking-lever K is provided on its bottom edge with a notch, N, into which the pivot L', connecting the other link H with the other extension-piece F, can pass. A hook, O, is suspended from each lever B near the free end.

The device is used in the following manner: In the position shown in Fig. 1 the prongs of the hooks O are passed through the legs of the carcass near the hoofs in the usual manner, and a hook suspended from a rope or pulley is passed through the swivel-eye J. The weight of the animal pulls the hooks O downward, and as the swivel-eye J is pulled upward the adjacent ends of the extension-pieces F are forced from each other. The bottom edge of the locking-hook K slides on the pin L', and finally when said pin reaches the notch N it drops into the same, thus locking the parts in place with the levers B extending in line. It is evident that as the levers B swing down their free ends swing from each other, as do also the legs of the carcass to which the hooks O are applied, and thus the rear legs of the carcass are spread. When the device has been raised to the desired position, it can be rested on the beams D, and the hooks used for raising the carcass can be disengaged from the swivel-eye J.

The advantages of this device are that the carcasses are spread automatically by the action of their weight, and when the carcasses are spread the parts of the mechanism are locked in position automatically by the locking-lever K.

Having thus described my invention, I claim as new and desire to secure by Letters Patent—

1. In a device for spreading carcasses, the combination, with a center piece, of levers pivoted to the ends of the same, extension-pieces secured to the levers and pivoted on the center piece, and a swivel-eye connected by links with the inner ends of said extension-pieces, substantially as shown and described.

2. In a device for spreading carcasses, the combination, with a center piece, of a lever pivoted to each end of the same, an extension-piece connected with the inner end of each lever and pivoted to the center piece, a swivel-eye connected by two links with the adjacent ends of the extension-pieces, a locking-lever pivoted to the inner end of one extension-piece and provided on its swinging end with a notch, and a pin on the inner end of the other extension-piece, which pin is adapted to pass into the notch of the lever, and hooks on the swinging ends of the levers, substantially as shown and described.

In testimony that I claim the foregoing as my invention I have signed my name in presence of two subscribing witnesses.

GOTTLIEB PAUL SCHMIDT.

Witnesses:
CARL ADOLPH PRAETORIUS,
PAUL DRUCKMULLER.